United States Patent [19]

Wright, Jr. et al.

[11] Patent Number: 5,857,201

[45] Date of Patent: Jan. 5, 1999

[54] ENTERPRISE CONNECTIVITY TO HANDHELD DEVICES

[75] Inventors: Gerald V. Wright, Jr., Solana Beach; James O'Grady, Del Mar, both of Calif.

[73] Assignee: Wright Strategies, Inc., San Diego, Calif.

[21] Appl. No.: 665,422

[22] Filed: Jun. 18, 1996

[51] Int. Cl.⁶ ..................................................... G06F 17/30
[52] U.S. Cl. ........................... 707/104; 707/10; 707/201
[58] Field of Search .................................. 395/617, 608, 395/610, 683, 149, 200.58, 200.03; 364/468; 379/58; 705/34; 707/201, 10, 104

[56] References Cited

U.S. PATENT DOCUMENTS

| | | | |
|---|---|---|---|
| 4,603,232 | 7/1986 | Kurland et al. | 179/2 |
| 4,651,288 | 3/1987 | Zeising | 364/519 |
| 4,730,253 | 3/1988 | Gordon | 364/415 |
| 4,863,384 | 9/1989 | Slade | 434/107 |
| 4,937,439 | 6/1990 | Wanninger et al. | 235/456 |
| 5,047,960 | 9/1991 | Sloan | 364/523 |
| 5,100,329 | 3/1992 | Deesen et al. | 434/327 |
| 5,204,813 | 4/1993 | Samph et al. | 364/419 |
| 5,208,907 | 5/1993 | Shelton et al. | 395/149 |
| 5,225,996 | 7/1993 | Weber | 364/550 |
| 5,283,861 | 2/1994 | Dangler et al. | 395/149 |
| 5,335,164 | 8/1994 | Gough, Jr. et al. | 364/149 |

(List continued on next page.)

OTHER PUBLICATIONS

"Announcing FormLogic, the First Seamless Platform to Eliminate Paper-Based Processes in the Field; Uses Low-Cost Handheld Computers to Extend Existing Enterprise Systems", Business Wire, p. 06180011, Jun. 1996.

"FormLogic Update Links PDAs to the Enterprise Debuts FormLogic 2.0 Development Software for Building & Deploying Mobile Client/Server Apps", PC Week, p. 29, Jun. 1996.

"Vendors Hawk Wares to VARS, Resellers at Trade Show: Multimedia and Emerging Handheld Markets Make their Mark at Macworld", Computer Reseller News, p. 53, Aug. 1995.

"Wright Strategies Seeks VARs Gathering Mobile Experience Launches FormLogic 2.0, a Client/Server–Based Data Collection Software for Mobile Users", Computer Reseller News, p. 55, Jul. 1996.

(List continued on next page.)

*Primary Examiner*—Paul R. Lintz
*Assistant Examiner*—Charles L. Rones
*Attorney, Agent, or Firm*—Knobbe, Martens, Olson & Bear, LLP

[57] ABSTRACT

A FormLogic (FL) client/server system and method to access existing enterprise data sources on an occasional basis. The system includes a FL builder program to generate a communications agent that encapsulates a communication session. The session includes one or more related tasks. The system also includes a FL server which is connected to one or more enterprise data sources. The FL server provides the ability to link hardware devices running a FL engine as a client to access existing enterprise data sources on an occasional basis. It is optimized to communicate by exchanging a minimum amount of data, since the wireless transports do not move large amounts of data quickly and data is expensive to move. Each session encompasses connecting the remote host, performing a specific task or set of tasks, then disconnecting from the host. Because the connection times must be short, the client and server need to be able to perform the required tasks without user intervention. The FL engine includes a user interface, a script engine, a communications module, and a local data store, and preferably runs on a mobile personal digital assistant. Upon connection, this local database is automatically manipulated by the FL server. The FL server can query the FL client database, add data to the client database, or remove data from the client database so as to make updates to both the client and server databases for reflecting changes that have happened on both sides since the last connection.

19 Claims, 5 Drawing Sheets

U.S. PATENT DOCUMENTS

| | | | |
|---|---|---|---|
| 5,408,619 | 4/1995 | Oran | 395/610 |
| 5,423,043 | 6/1995 | Fitzpatrick et al. | 395/683 |
| 5,434,994 | 7/1995 | Shaheeh et al. | 395/617 |
| 5,463,555 | 10/1995 | Ward et al. | 364/468 |
| 5,581,753 | 12/1996 | Terry et al. | 395/617 |
| 5,600,834 | 2/1997 | Howard | 707/201 |
| 5,603,026 | 2/1997 | Demers et al. | 395/608 |
| 5,666,530 | 9/1997 | Clark et al. | 395/617 |
| 5,696,903 | 12/1997 | Mahany | 395/200.58 |
| 5,704,029 | 12/1997 | Wright, Jr. | 395/149 |
| 5,706,431 | 1/1998 | Otto | 395/200.03 |
| 5,742,668 | 4/1998 | Pepe et al. | 379/58 |
| 5,745,884 | 4/1998 | Carnegie et al. | 705/34 |
| 5,758,355 | 5/1998 | Buchanan | 707/201 |

OTHER PUBLICATIONS

Hwang, Diana "Start–up Wright Strategies is Seeking the 'Right Strategy': Making it OmniForm Data–Collection Software Competitive", Computer Reseller News, p. 49, Feb. 1995.

Ladin et al. "Providing High Availability Using Lzay Replication", ACM Transactions on Computer Systems, v.10, n.4, pp. 360–391, Nov. 1992.

Day et al. "References to Remote Mobile Objects in Thor", ACM Letters on Programming Languages and Systems, v.2, n1–4, pp. 115–126, Mar. 1993.

Wayfarer Press Release: Jan. 29, 1996, "Wayfarer Introduces First Server Software to Support High–Performance Client/Server Applications Over the Internet", 4 pages.

Wayfarer White Paper, "Moving Client/Server to the Internet," 8 pages, printed May 20, 1996.

Tsukashima, Ross, "I Don't Do Windows What's Up With the Newton?," ComputerEdge, pp. 50, 52, 54, Jun. 7, 1996.

Goodman, Danny, "The Newton Shuffle", MacUser, pp. 183–184, Feb. 1994.

Thornon, J. et al., "Using Computers to Survey Property", Public Finance Account, Feb. 12, 1993 (abstract only).

Brochure entitled "Introducing the ETE Communicator", ETE, Inc., Nov., 1993.

Brochure entitled "Form Factor, Business and Personal Data Collection for PDAs", Meta Pacific, 1993.

Apple Computer, Inc. "The NewtonScript Programming Language, Alpha Draft 1.0", Jul. 17, 1993.

Brochure entitled "Newton Software Titles, Starcore", Newton, 1993.

Straley, S.J., "Straley's Programming with Clipper 5.0", A Bantam Book, Jul. 1991, pp. 166–169, 1015–1020, 1079–1081, 1084–1087, 1090–1107.

1

ENTERPRISE CONNECTIVITY TO HANDHELD DEVICES

BACKGROUND OF THE INVENTION

1. Field of the Invention

The present invention generally relates to client/server technology and, more specifically, to a client/server architecture for occasional connections between mobile computing devices and enterprise computing systems.

2. Background

In the current persistent connection client/server model, personal computer clients "connect" to a server on the network and request data from the server as needed by an application. This is usually performed by use of SQL (Structured Query Language). The connection between the client and server exists the entire time the application is in use, usually for hours at a time. This is not possible in a mobile model, because it is not possible for mobile clients to remain connected for that amount of time. Mobile clients connect on an occasional basis, and when they do connect, the connection needs to move the smallest amount of data in the least amount of time. This is because wireless transports are not capable of moving large of amounts of data quickly, and data is extremely expensive to move.

Existing client/server technologies based on persistent network connections were not designed to support occasional connections between low performance, low overhead handheld computing devices and existing enterprise computing systems. What is needed is a client/server architecture that supports occasional connections between low performance, low overhead mobile computing devices and existing enterprise computing systems. What is desired is an application development and deployment platform, such that developers have the ability to create applications using a series of forms, tables, and communications agents, and the ability to deploy and maintain these applications. This platform should be implemented using an object model that can be easily ported to other hardware platforms and operating systems.

An architecture that allows multiple devices to connect concurrently to a single server is desired. This architecture should allow developers to connect any existing enterprise data source to handheld clients in the field. This architecture should allow developers to create two way links between any existing enterprise data source on a network, such as a database, mail server, or internet news feed, and FormLogic client applications.

The improved client/server architecture should provide "transport independence", which is a unique requirement of field based applications. Sometimes it is necessary to connect over a serial cable, other times over a wireless local area network (LAN), and other times over the Internet. Such functionality has been addressed with "middleware" products. However, middleware products usually consist only of a series of "C" application programming interfaces (APIs) on client and server ends that require the developer to integrate them into an application. What is desired is to integrate "middleware" functionality directly into a specific server structure for which developers create "services".

Existing client/server APIs move a tremendous amount of data, such as Microsoft™'s ODBC (Open Database Connectivity). It is not feasible to use interfaces such as ODBC in the handheld or occasionally connected environment for two reasons. 1) The code size of ODBC is several megabytes—more than the entire memory of today's handheld devices and 2) ODBC is designed to work over a persistent connection with high bandwidth, such as Ethernet. Therefore, what is desired is a set of client/server APIs that can utilize a variety of transports to move a minimum amount of data over the wire or through the airways. To accommodate current and future transports, a message-based asynchronous communications protocol that is designed to work efficiently over low bandwidth, high latency networks is needed. This capability is required for evolving wireless transports, such as these provided by the companies of ARDIS™, RAM Mobile Data™, and 2-way paging, such that developers will automatically be able to support them without making any changes to their applications.

Application software on a client device may not be the most recent available due to enhancements, fixes, and so forth. The architecture should support a users and groups model, wherein different applications modules can be distributed to a particular user or group. Using a version control for these applications components, users can automatically be updated with the latest version of an application upon connection.

SUMMARY OF THE INVENTION

The client/server (C/S) architecture of the present invention is designed to allow the client to become a direct extension of the corporate data sources. The C/S components use an object management scheme and are preferably based on Microsoft™'s OLE technology. A 32 bit OLE control (OCX) is used to manage a connection with a multiple mobile personal digital assistant (PDA). This architecture allows the developer to manage a single connection with a single PDA device. It provides a completely asynchronous communications interface, providing multiple connections with multiple devices at the same time. Applications built with existing development tools can be enabled to either exchange data on demand, or provide facilities for a multi-port server allowing remote database access and e-mail access from the field. When used with client/server development tools such as Visual Basic™, this server object allows developers to create direct connections between PDA devices, and nearly any host data source, including databases, mail servers, and Internet data sources.

In one aspect of the present invention there is a client/server system, comprising a portable client computer, comprising a client database, and a communications module; a server computer, comprising a server data source, a session module, in communication with the server data source, to non-persistently connect to the communications module and access the client database from time to time.

In another aspect of the present invention there is, in a computer network, including a server, a data source, and a mobile client having a database, a method of synchronizing the client database and data source during a non-persistent connection, the method comprising the steps of connecting the mobile client to the server; manipulating the client database by the server; updating the data source responsive to the manipulation by the server; and disconnecting the client from the server.

DETAILED DESCRIPTION OF THE PREFERRED EMBODIMENTS

Figure 1:
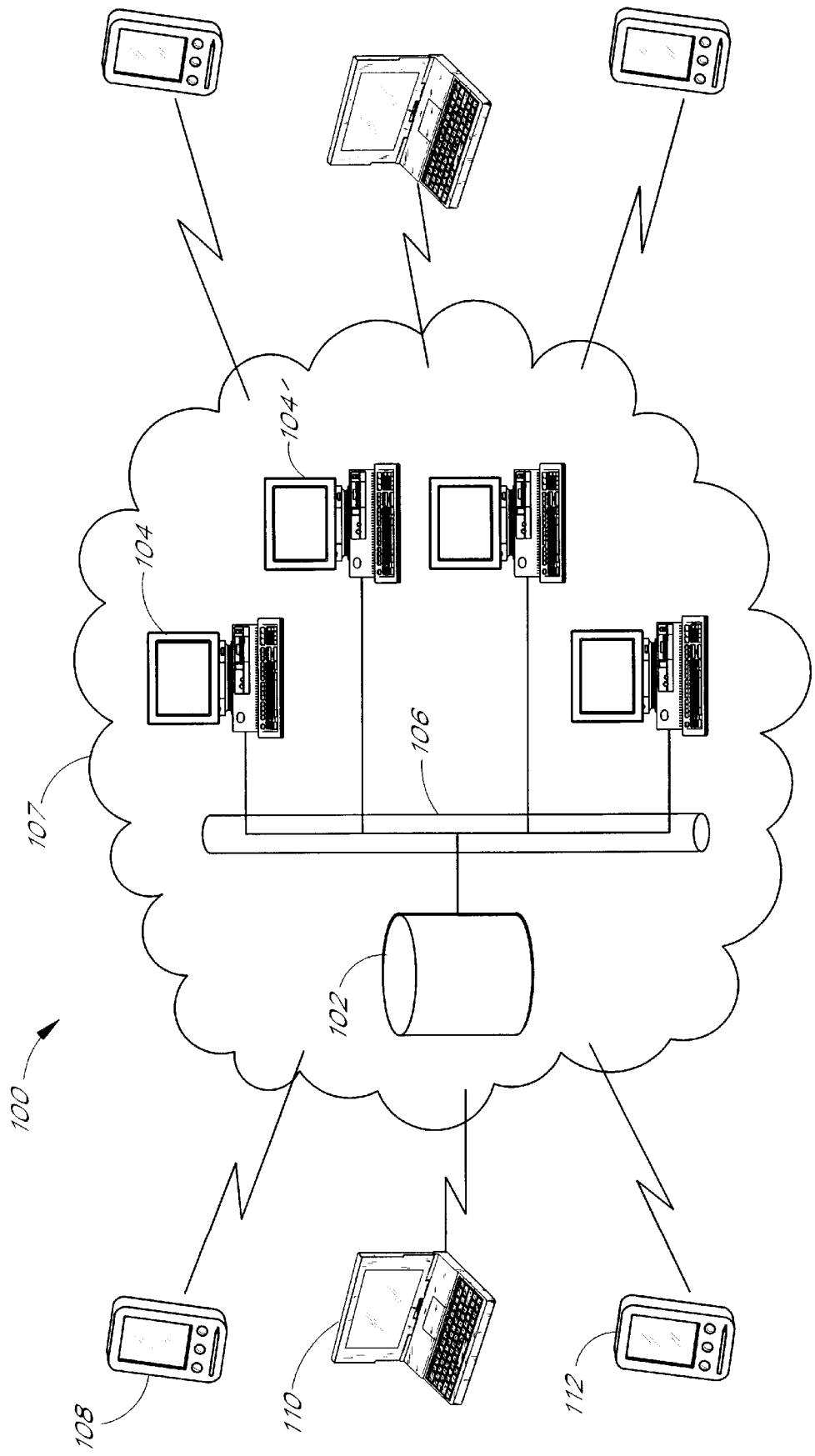
FIG. 1 is a block diagram of an exemplary known client/server system.

The following detailed description of the preferred embodiments presents a description of certain specific embodiments to assist in understanding the claims. However, the present invention can be embodied in a multitude of different ways as defined and covered by the claims. Reference is now made to the drawings wherein like numerals refer to like parts throughout.

The new FormLogic client/server (C/S) architecture is designed to allow a FormLogic client to become a direct extension of the corporate database. Previously, as described in applicant's copending patent application, now U.S. Pat. No. 5,704,029, FormLogic clients provided data to host databases in the form of ASCII files that had to be imported into the target database. While reliable for batch file processing, this method did not provide a direct link between the client personal digital assistant (PDA) and the enterprise database. Furthermore, there was no way to automatically extract records from the enterprise database, and send them to the device. The new FormLogic C/S architecture overcomes these limitations by allowing developers to create direct links between PDAs and enterprise data sources using industry standard development tools.

The new FormLogic client/server components described herein use an object management scheme and are preferably based on Microsoft™'s OLE technology. A 32 bit OLE control (OCX) is used to manage a connection with a multiple PDA device. Because this OCX component is based on the industry standard component software model, it can be used with all leading industry standard development tools including Lotus Notes™, Microsoft Visual Basic™, Microsoft Access™, Microsoft Visual FoxPro™, Borland Delphi™ and PowerBuilder™. The OLE implementation also provides the developer with a familiar object model and programming interface for integrating PDA technology into a predominantly Windows™-based computing infrastructure. This allows developers to create PDA-based solutions using their existing development tools, avoiding the need to develop for proprietary PDA operating systems.

A key component of the FormLogic client/server architecture is the FormLogic service object. The FormLogic service object allows developers to link PDA client applications for an unlimited number of user connections over a variety of transports without the need to worry about multi-user and concurrency issues. The service object allows the developers to write the application as if it were communicating with a single client, allowing them to focus on the application itself, rather than focus on communications transport, multi user, and concurrency issues.

The FormLogic service object has the following features:
Ability to retrieve specific records based on a query;
Ability to programmatically build and send records to the FormLogic Client;
Ability to send asynchronous messages between the Clients and Server;
Support for direct serial and modem connections;
Support for AppleTalk™ (ADSP) and Internet (TCP/IP) network connections;
OCX (ActiveX) implementation allowing integration with a host of development tools;
Ability to customize the FormLogic Client Connection dialog during connections;
MD5 authentication with the FormLogic Client;
Complete Software Distribution interface allowing developers to programmatically install FormLogic forms, agents and tables during connections;
100% asynchronous interface.

A variety of applications are possible for the new FormLogic client/server architecture. Several exemplary applications are described below:

Provide Real-Time Access to Corporate Databases - Probably the most exciting use of the FormLogic C/S architecture is the integration of PDA technology with enterprise computing environments. Developers can now build applications that allow PDA devices to connect to virtually any type of database, from Microsoft Access™ to Oracle™, or even legacy systems. Once connected, developers can create applications that can query as well as update the database. For example, this allows for extremely fast development of field service applications, wherein field personnel connect to a remote database to retrieve work orders, and then later update the same work orders.

Create Robust E-mail Gateways - Using existing OLE controls from third parties, developers can easily integrate existing Messaging API-based or point-of-presence (POP)/Simple Mail Transfer Protocol (SMTP) mail systems. This provides opportunities for developers seeking to provide an application that provides access to both a host database and an enterprise e-mail system in a single connection.

Create Sophisticated Servers - Because the FormLogic Connection object is based on the OLE component technology, developers can create applications that host multiple simultaneous connections with a minimum amount of effort. Existing applications created with tools such as Microsoft Access™, can quickly be turned into servers capable of hosting numerous simultaneous connections to PDA devices in the field.

Integrate PDA Data Transfer Functionality Into Existing Applications - Existing applications can easily be modified to provide simple data exchange facilities with PDA devices. This allows portions of databases to be carried into the field where they can be modified and later synchronized with the server database.

Referring to FIG. 1, a typical client/server (C/S) system 100 previously known in software technology is shown. The system 100 includes a database 102, one or more servers 104, such as a mail server 104', and a local area network (LAN) 106. Alternatively, the LAN could be a wide area network (WAN) or an intranet. The database 102, the servers 104 and the LAN 106 collectively are known as the server portion 107 of the client/server system. A plurality of clients, such as personal digital assistants (PDAs) 108, 110 and 112, are in communication with the server portion 107. The communication may be over a direct serial link, such as a serial cable or a modem.

In a traditional persistent connection based client/server model, clients remain connected and request data from the server as they need it. As the data is requested it is stored locally for manipulation and then discarded. The server still remains the primary and only main storage area for the data because the client always has access to it when needed.

Figure 2:
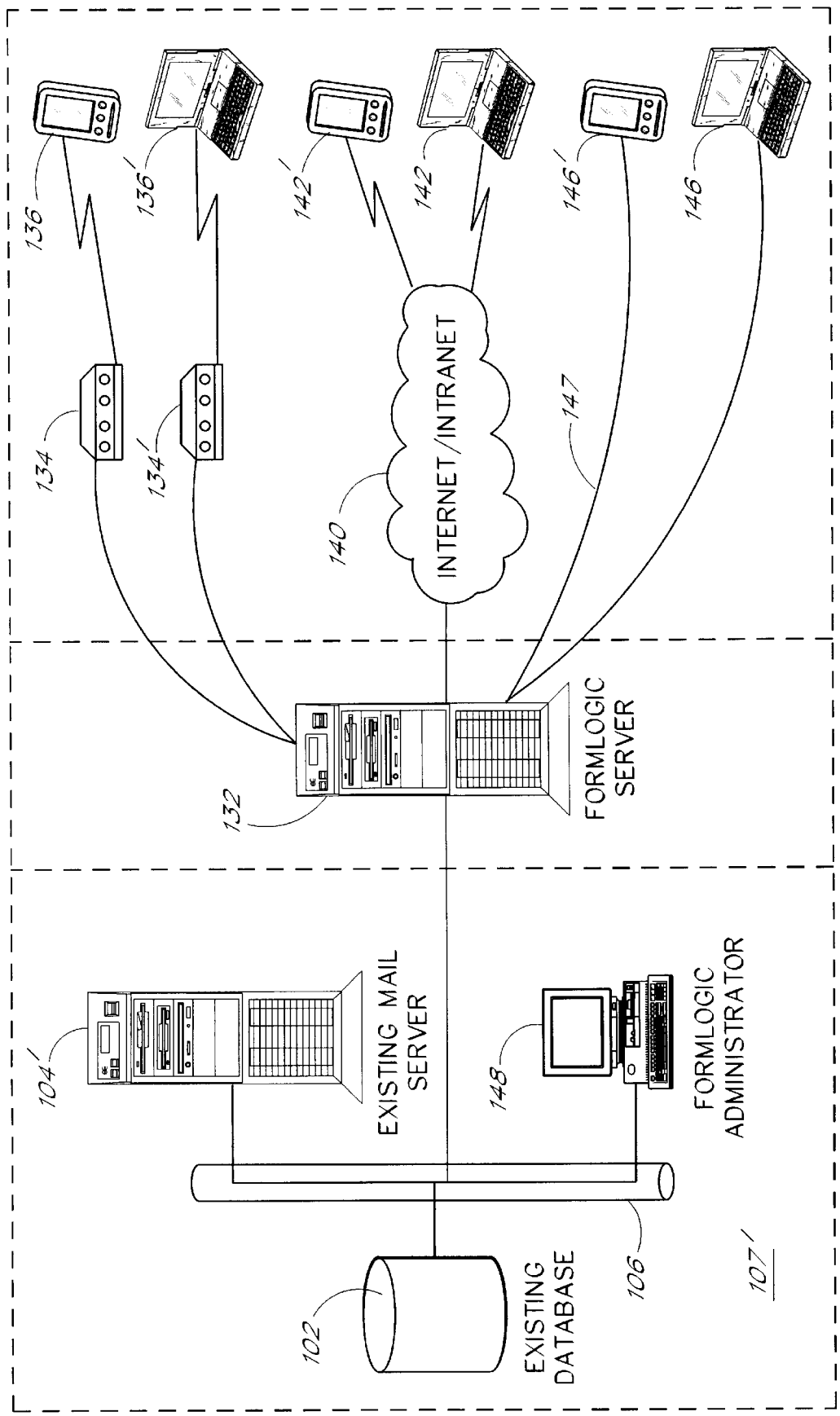
FIG. 2 is a high-level block diagram of a preferred client/server embodiment of the present invention.

Referring to FIG. 2, a client/server system 130 of the present invention will be described. The client/server system 130 hereinafter may also be referred to as the FormLogic client/server system. The system 130 includes the database 102, the mail server 104',the LAN 106 and an administrator server 148. This portion 107' is similar to the server portion 107 of FIG. 1. However, a FormLogic (FL) server 132 is connected to the LAN 106 in a persistent fashion to provide advantages not possible with the traditional system 100. The FL server 132 is connected to a plurality of client subsystems. For example, modems 134 and 134' interconnect the FL server 132 and PDA clients 136 and 136', respectively. An intranet or the Internet interconnects the FL server 132 and clients 142 and 142'. Client devices 146 and 146' are directly connected to the FL server 132 by a serial cable 147, for example.

Figure 3:
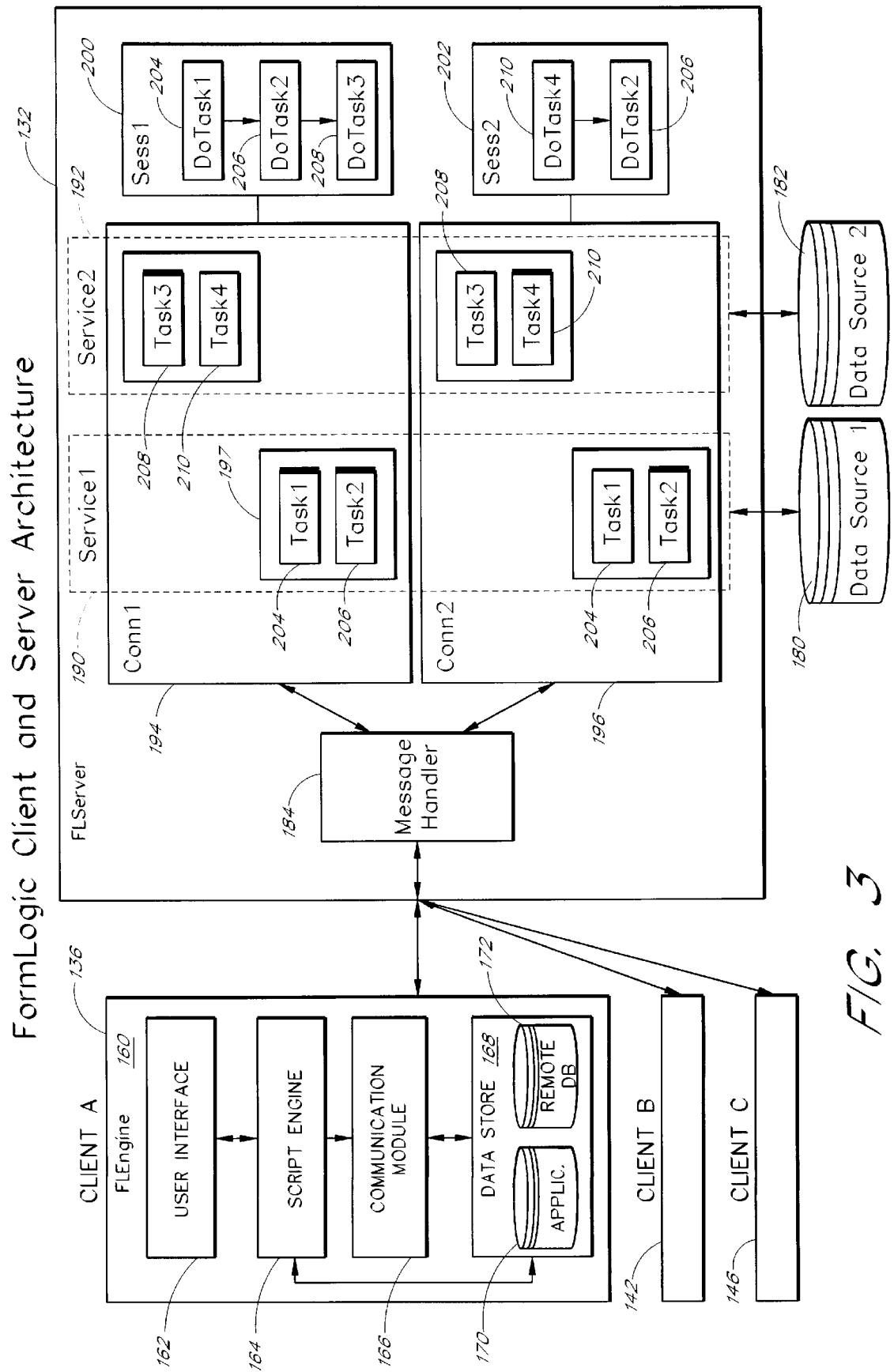
FIG. 3 is a block diagram of the architecture of client components and server components of the system shown in FIG. 2.

Referring to FIG. 3, the architecture of the FormLogic server 132 and a representative FormLogic client 136 will be described. The FL server and FL client were introduced in conjunction with FIG. 2.

FL Client

The FL client 136 includes an FL Engine 160 which allows FormLogic applications to execute on a variety of handheld devices. The FL Engine 160 preferably runs on an Apple® MessagePad® Model 120 or Model 130 PDA using the Newton® version 2.0 operating system software. Of course, other portable computer devices and operating system software, such as Magic Cap™ from General Magic™ or Pegasus™ from Microsoft™ Corporation, can be used in other embodiments. The FL Engine 160 is, in simple terms, a hardware independent virtual machine that allows a single application to work on various hardware platforms. A similar example is the Java virtual machine, licensed by Sun Microsystems™, which may or may not execute within the context of a browser.

The FL client subsystem 136 preferably includes the FL Engine 160 comprising a user interface (UI) 162, a script engine 164, a communications module 166, and a data store 168. The user interface (UI) 162 and the script engine 164 have been previously described in applicant's copending patent application, now U.S. Pat. No. 5,204,029, which is hereby incorporated by reference. The communication module 166 packages data that is either being received or sent by the FL Engine 160 and handles interfacing the FL Engine to the FL Server 132 through the modem 134, the Internet 140 or the direct serial connection 147. Another embodiment may include a wireless LAN. The data store 168 includes one or more application programs 170 and a remote database 172 for storing the results of running the application program or storing data received from the FL Server 132, for example.

Because FormLogic clients, e.g., 136, do not maintain persistent connections with the FL server 132, they need to be able to store and access information while not connected to the host database, e.g., 182, or other data source. The FL Engine 160 incorporates a full local database implementation that allows data to be manipulated and collected by the FL client while not connected to the FL server 132. Upon connection, this local database 172 is automatically manipulated by the FL server 132. The FL server 132 can query the client database 172, add data to the client database, or remove data from the client database in order make updates to both the client and server databases to reflect changes that have happened on both sides since the last connection. Thus, a synchronization of the two databases is performed.

In the FormLogic C/S model, the FL server 132 maintains the primary enterprise database, e.g., 180, but instead of maintaining a full-time connection with clients, clients connect on an occasional basis. During this connection, the FL server 132 is responsible for manipulation of the FL client database 172, including retrieving data that has been collected by the client since the last connection, or inserting new data in the database that has been added on the FL server 132 since the last connection. The client database 172 serves as a temporary representation of the host database, e.g., 180, because the client cannot maintain a full-time connection to the FL server 132. On the server side, a Remote Database API has been developed that allows developers to efficiently manipulate the client database 172 while sending a minimum amount of data over the connection.

FL Server

The implementation of the FormLogic Server architecture is unique. To allow the FL server 132 access to any data source a developer may already be working with, an API is provided between those existing data sources, e.g., 180, 182, and the FL server 132. The FL server 132 comprises an OCX (Microsoft™ OLE Custom Control), or software component, that can be embedded in a variety of existing development tools, including those tools that are already being used by developers to access enterprise data sources (e.g., MS Visual Basic™, PowerBuilder™, Delphi™, Visual C++™). This allows developers to easily extend the FL server 132 to their data sources using tools they are already familiar with.

The FL server 132 provides the ability to link hardware devices running the FL Engine 160 to access existing enterprise data sources on an occasional basis. It is optimized to communicate by exchanging a minimum amount of data, since the wireless transports are expensive and are characterized by high latency and low bandwidth. The FormLogic Server 132 serves as a "gateway" between FormLogic Clients (e.g., 136, 142, 146) and enterprise data sources (e.g., 180, 182). The server 132 supports what is known as a multi-tier client/server model in that it creates an intermediate server between the client and the "traditional" or "original" server.

The FL Builder (not shown) is a development tool, previously described in applicant's copending patent application, now U.S. Pat. No. 5,704,029, used to build FormLogic applications that can be executed on a variety of hardware platforms. It is designed to give developers the look and feel of existing development tools, preferably Microsoft Visual Basic™, while at the same time introducing some innovative features. It is a WYSIWYG tool that allows one to write code. It is unique in that it allows developers to create an object called a "communications agent" or just "agent" that encapsulates a communications "session".

Because mobile clients cannot maintain a persistent connection to the FL server 132, they must "connect" for short periods of time to perform a specified operation or set of operations. Each of these connections is referred to as a "session", during which time a specified set of operations are performed between the FL client and FL server. Examples of these sessions include connecting to retrieve work orders, checking inventory on a product, or retrieving a monthly price list update. Each "session" encompasses connecting the remote host, performing a specific task or set of tasks, and then disconnecting from the host. Because the connection times must be short, the FL client and FL server need to be able to perform the required tasks without user intervention. This is very different from a persistent connection based client/server model where the connection exists the entire time the application is used, and data is only retrieved when the user requests it.

Communications agents, also just known as "agents", are developed to describe the communications "session". Communications agents know how to connect to a particular host, perform a set of operations or tasks, which usually includes synchronizing the host data source, e.g., 180, with the client database 172, and then disconnecting. The idea is that a developer can create a communications agent that represents each of the communications sessions that a field user may need. For example, there may be a communications agent that retrieves work orders, updates work orders, or downloads a price list. There may also be a communications agent that simply checks inventory on a particular product. In general, communications agents are designed to encompass the fundamental operations that are needed to exchange data between a client and a host for a particular application.

The agent implementation is simple, and utilizes a simple software "object" to describe the agent. The developer creates a named object and provides a name, as well as other properties, which, upon connection, tell the FL server what type of session the FL client is requesting, as well as any parameters required to perform specific operations in that session. Agents may also specify a particular transport to minimize the cost of a connection, e.g., an agent needing a long connection time would use a less expensive type of transport.

An exemplary Session1 200 called Daily Connect includes three tasks: Task1 204, e.g., GetMail; Task2 206, e.g., SendMail; and Task3 208, e.g., UpdateInventory. Another exemplary Session2 202 includes two tasks: Task4 210, e.g., InterrogateInventory; and Task2 206, SendMail.

The FL Server 132 includes a message handler 184 for interfacing the FL Server 132 to the FL Engine 160 through the modem 134, the Internet 140 or the direct serial connection 147, for example. The message handler 184 communicates with each instantiation of the FormLogic Connection object. For example, as shown in FIG. 3, a Connection object 194 may be associated with Client A 136 and a Connection object 196 may be associated with Client C 146. Each of these connections are independent, and a plurality of connections may be concurrent. Each Connection object has a current task pointer for pointing to the current task. When the task is completed, the pointer is incremented to point to the next task in the session. Each of the Connection objects is pointing to a particular task in a particular session. In FIG. 3, for example, Connection object 194 is pointing to Session1 and Connection object 196 is pointing to Session2. There is one real object for each session, and each connection points to its current place (task) in the session.

A set of tasks are provided or handled by a service. A service defines the relationship between a client application and an enterprise data source. Examples of services include Mail, World Wide Web Gateway, or Inventory. For example, a Mail service 190 is a service that provides the Getail task 204 and SendMail task 206, and is connected to the data source 180. An Inventory service 192 provides the UpdateInventory task 208 and InterrogateInventory task 210, and is connected to an inventory data source 182, for example. Each Connection object has its own instantiation of the service class associated with it. For example, Task1 and Task2 comprise an instantiation of Service1 for Connection object 194. The service is written as if the server was in communication with a single client. Multiple copies of the service are needed for each single client connection coming into the FL server. Each instantiation of the service does not maintain connection to its data source; only the "master" service object maintains connection to the associated data source. The service instantiations can be considered as interfaces between the "master" service and the connection.

FL Server APIs

The FL Server APIs allow developers to write services for FL Server that will link FonmLogic client applications to existing enterprise data sources without worrying about multi-user and concurrency issues. The FL Server APIs are used from within Visual Basic or other development tools to communicate with FL Engine and allow server applications for an unlimited number of user connections over a variety of transports without the need to worry about multi-user and concurrency issues. The server object allows the developers to write the application as if it were communicating with a single client, allowing them to focus on writing services for the application itself, rather than focus on communications transport, multi-user, and concurrency issues.

Service methods are invoked by services, usually with the convention "connobj.MethodO". Some methods such as of the remote database APIs have corresponding events that are triggered by the messages from the client indicating the results of the actions invoked by the method.

The Service APIs fall into three distinct categories: the Remote Database APIs, the Messaging APIs, and Utility APIs:

Remote Database APIs

These calls are used to directly manipulate the client database during a connection. When invoking Remote Database APIs from services, corresponding events will be passed back to the services that generated the call. A remote procedure call mechanism is used. There is a corresponding event for every Remote Database API. Corresponding events are guaranteed to be called, assuming the method used to trigger it did not return an error. Methods and Events for the Remote Database APIs are listed in Table 1 below.

TABLE 1

| Method | Corresponding Event |
| --- | --- |
| CreateRecordSet (RSName, tableName, queryDef) | OnCreateRecordSet |
| GetNextRecord (RSName) | OnGetNextRecord |
| AddRecord (RSName, FLRec) | OnAddRecord |
| DeleteRecord (RSName, FLRec) | OnDeleteRecord |
| DeleteRecordSet (RSName) | OnDeleteRecordSet |
| Event | |
| OnCreateRecordSet (errcode, RSName, recordCount) | |
| OnGetNextRecord (errcode, RSName, record) | |
| OnAddRecord (errcode, RSName) | |
| OnDeleteRecord (errcode, RSName) | |
| OnDeleteRecordSet(errcode, RSName) | |

Method details and Event details for the Remote Database APIs are listed in Table 2 below.

TABLE 2

| | | |
| --- | --- | --- |
| CreateRecordSet(tableName queryDef, RSName) | | |
| RSName | String | User defined recordSet name. |
| tableName | String | Name of table on FormLogic Client. |
| queryDef | String | SQL "Where" clause |
| returns errcode | | |
| GetNextRecord(RSName) | | |
| RSName | String | User defined recordSet name. |
| returns errcode | | |
| AddRecord(RSName, FLRec) | | |
| RSName | String | User defined recordSet name. |
| FLRec | FL Record Object | Record to send to FormLogic Client. |
| returns errcode | | |
| DeleteRecord(RSName, FLRec) | | |
| RSName | String | User defined recordSet name. |
| FLRec | FL Record Object | Record to send to FormLogic Client. |
| returns errcode | | |
| OnCreateRecordSet(errcode, RSName, recordCount) | | |
| errcode | Long | Error code. |
| RSName | String | User defined recordSet name |

TABLE 2-continued

| | | |
|---|---|---|
| recordCount | Long | Number of records in RSName recordSet |
| OnGetNextRecord(errcode, RSName, FLRec) | | |
| errcode | Long | Error code. |
| RSName | String | User defined recordSet name |
| FLRec | FL Record Object | Record received from FormLogic Client. |
| OnAddRecord(errcode RSName) | | |
| errcode | Long | Error code. |
| RSName | String | User defined recordSet name |
| OnDeleteRecord(errcode, RSName) | | |
| errcode | Long | Error code. |
| RSName | String | User defined recordSet name |

Messaging APIs

These APIs are used to send specific messages to FormLogic Agents 170 (FIG. 3) on the client device. A rules-based specification of a particular agent on the client can be done. Messages can be used to send any type of data in real time, and allows the agent on the client side to decide how to handle it. Virtual sessions can be established with these APIs. Methods and Events for the Messaging APIs are listed in Table 3 below.

TABLE 3

| Method |
|---|
| Send |
| Reply |
| Event |
| OnMessage |

Method details and Event details for the Messaging APIs are listed in Table 4 below.

| | | |
|---|---|---|
| Send(agentID, methID, message) | | |
| agentID | Long | Client agent ID |
| methID | Long | Developer defined method ID |
| message | FL Record Object | Record to send to FormLogic Client. |
| returns errcode | | |
| Reply(agentID, methID, message) | | |
| agentID | Long | Client agent ID |
| methID | Long | Developer defined method ID |
| message | FL Record Object | Record to receive from FormLogic Client. |
| returns errcode | | |
| OnMessage(errcode, objID, methID, FLRec) | | |
| errcode | Long | Error code. |
| objID | Long | User defined object ID |
| methID | String | User defined method ID |
| FLRec | FL Record Object | Record to send to FormLogic Client. |

Utility APIs

Utility APIs don't actually send any data between the server and the client. They are used to perform functions such as setting timers, writing to the system log, and controlling the client's connection dialog. Methods and Events for the Utility APIs are listed in Table 5 below.

TABLE 5

| Method |
|---|
| SetTimer (Name, interval) |
| LogEntry (messagetype, message) |
| SetStatus (message, gaugeType, currVal) |
| GetUsername ( ) |
| GetAgentParm (parmName) |
| StartNextTask |

TABLE 5-continued

| Event |
|---|
| OnTimer (errcode, RSName) |

Method details for the Utility APIs are listed in Table 6 below.

TABLE 6

| | | |
|---|---|---|
| LogEntry(messagetype, message) | | |
| messagetype | Integer | Message type |
| message | String | Text message |
| returns errcode | | |
| SetStatus(message, gaugeType, currVal) | | |
| message | String | Text message |
| gaugeType | Integer | kProgressbar = 0, kBarberPole = 1 |
| currVal | Integer | Gauge position between 0 and 100. |
| returns errcode | | |

The LogEntry method provides the ability to write to the system log when a selected activity occurs, e.g., when the user logs on or off. Error messages can be written to the system log specific to a particular service that the developer is writing. The system log can be read by the system administrator. This method could be used for billing clients. For example, a log entry could be made every time a message is read from a news feed service.

The SetStatus method gives the FL server a means to update a dialog box on the client side without causing an extra message to be sent over the link, i.e., this method does not generate additional traffic on the link. The update message is jammed into the next message or packet that is being sent.

The SetTimer method provides a way to determine if the client has responded. The developer can set an alarm time interval and an alarm timer name to measure elapsed time. After the alarm is triggered, an OnTimer Event is fired with the name of the alarm timer. This method is used to prevent code block or lockup, and is used in place of a timeout because different transports take different amounts of time to respond.

The GetUsername method can be used inside the service to obtain the name of a logged-on user.

The GetAgentParm method allows a service to extract any of the parameters sent over to the FL server at log-on time. For example, a Mail agent may pass over a log-on name, a password and a mail server ID. The FL server stores these parameters for the developer to use inside the service. In the current example, the developer could use the internet protocol (IP) address of the mail server inside the service.

The StartNextTask method is used by the developer to execute the next task after the current task is completed. After StartNextTask is called, the FL server takes over and automatically gets and executes the next task in the session.

Example Client/Server Message Exchange

Figure 4A:
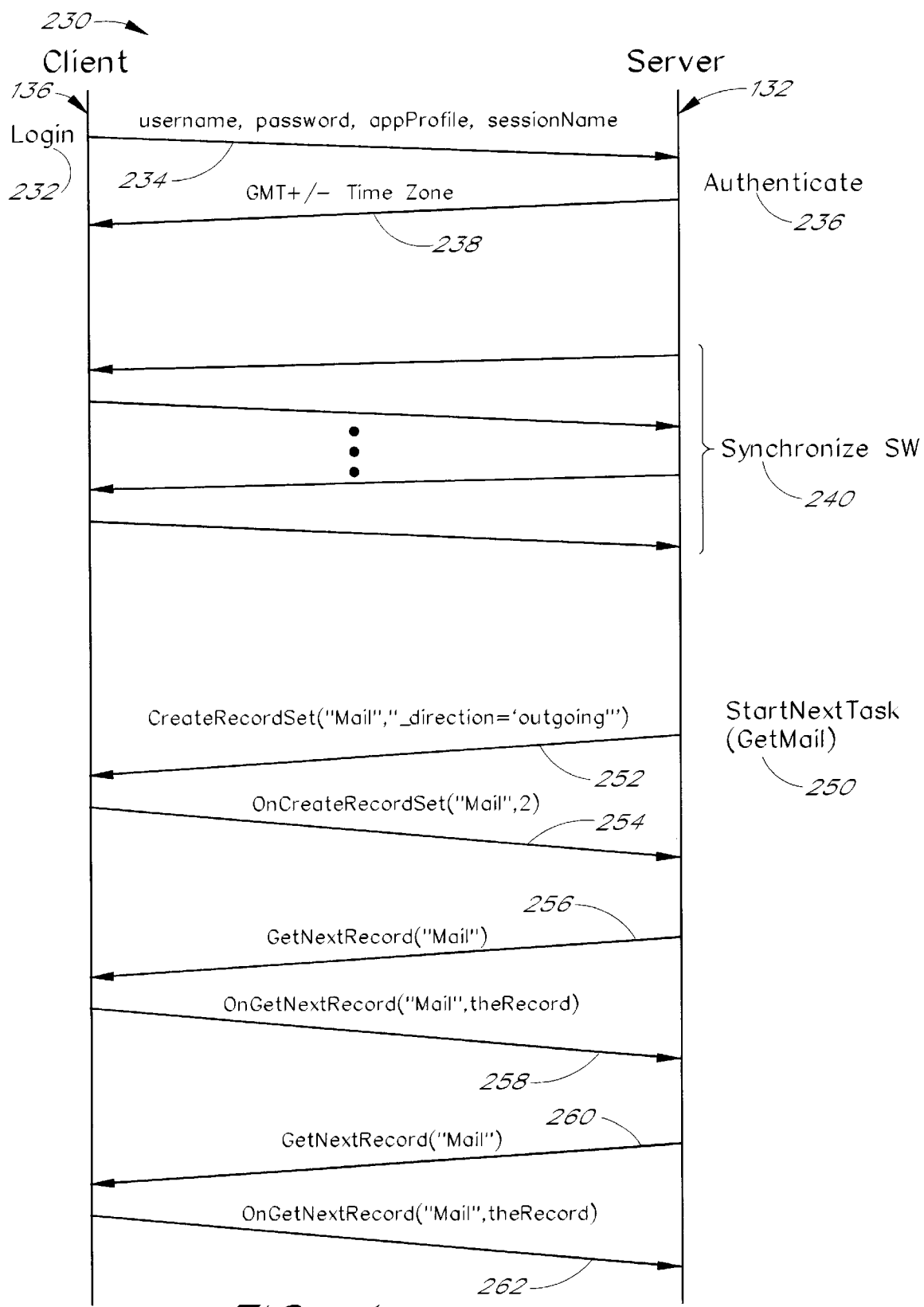
FIGS. 4a and 4b are a diagram showing an exemplary client/server message exchange for a mail exchange session.
Figure 4B:
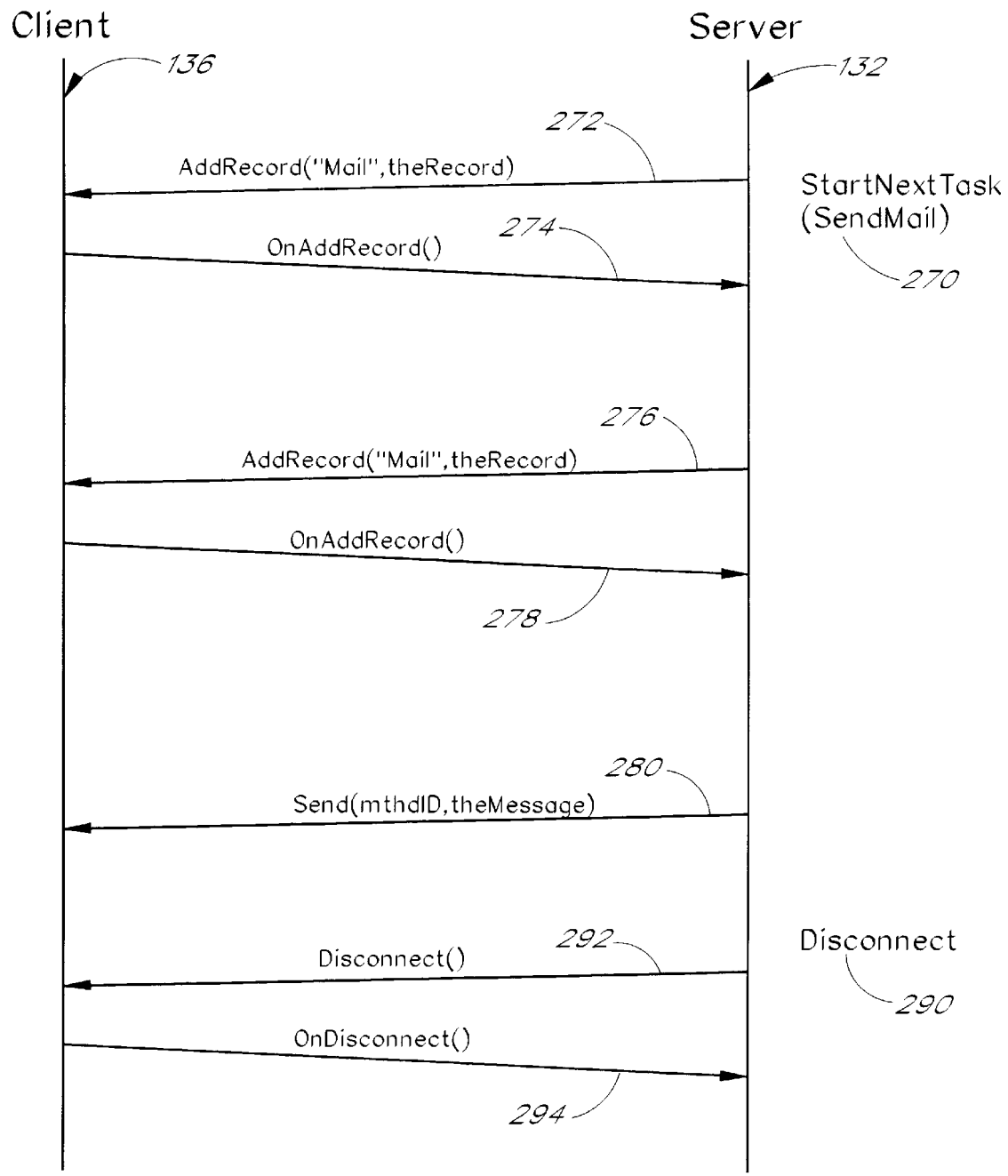

Referring to FIGS. 4*a* and 4*b*, an exemplary client/server message exchange for a Mail Exchange session 230 will be described. The exchange between the FL client 136 and the FL server 132 is shown in a graphical time dependent format. Time increases while traversing downward on the graph.

The session shown in FIGS. 4*a* and 4*b* illustrates a single service. Of course, other services could be part of a single session. The session shown in FIGS. 4*a* and 4*b* shows Task1 (204) and Task2 (206) of Session1 (200). Task3 (208) is not shown in this session.

The session 230 begins with a user initiating a login 232. A message 234 passes a username of the user, the user's password, an application profile, and a session name to the server. The application profile is a client list of all its applications and includes forms, agents, tables and respective version numbers. The server maintains an administration profile which is a list of the most current applications and the version numbers of the applications and their forms, agents and tables.

The server authenticates 236 the received data from the message 234, i.e., the received username and password are verified as correct. In response, the server sends the time of authentication 238 to the client. The server also checks the application profile received from the client against its administration profile to determine if the client applications are current as determined from the version numbers. If any applications are not current, a synchronize software operation 240 is initiated by the server to update the client machine. The most current application(s) are then sent over to the client using a handshaking mechanism. Since FL application and updates are relatively small, this process should complete rather quickly.

At the completion of the software synchronization 240, the server accesses the exemplary ExchangeMail session. StartNextTask 250 is automatically called by the server for the first task (GetMail) in the session. A CreateRecordSet method 252 (Remote Database API) is invoked by the server. A recordSet object represents a plurality of records in a base table or the records that result from running a query. In this instance, the name of the recordSet is "Mail" and the "_direction='outgoing'" string is a query that identifies records in the Mail table for which the direction is outgoing. The communication module 166 at the client creates a set of records on the client device in response to the message 252. It also sends an OnCreateRecordSet event 254 to the server. The recordSet name ("Mail") and a recordCount, which is the number of records in the recordSet, e.g., two pieces of outgoing mail, are returned to the server.

The server then utilizes the GetNextRecord method 256 to retrieve the first record from the "Mail" recordSet. The communication module 166 at the client responds with an event which is received by OnGetNextRecord 258 at the server. The recordSet name ("Mail") and a FL record object (the Record), are returned to the server. The FL record object is an object of type FL record that encapsulates a set of fields and their values. In this instance the results are sent to mail server, but could also be sent to a printer, a screen display, or to a database, for example. In the preferred embodiment, after the record is received at the server, the record is deleted at the client. In another embodiment, the record is maintained at the client. The second outgoing mail record is retrieved by a second GetNextRecord method 260 and OnGetNextRecord event 262. At the completion of event 262, both pieces of mail have been retrieved from the client by the server. Continuing the session 230 on FIG. 4b, the session calls StartNextTask 270 to invoke a SendMail task. The server utilizes an AddRecord method 272 to send mail to the client. The recordSet name ("Mail") and the FL record object (the Record), are passed to the client. The mail server or other source of data is interrogated to determine the data to be sent to the client. This example assumes that the recordSet is available from the previous GetMail task and that the SendMail task is done after GetMail. Alternatively, a CreateRecordSet method could be invoked at the beginning of the SendMail task (before AddRecord). Using a flag or other indicator, a check could be done to determine if the recordSet is already created, and if not, the CreateRecordSet method would be invoked.

The client receives the FL record object (the Record) and responds to the AddRecord method with an OnAddRecord event 274. The server checks every event to determine if an error code is included, and if so, takes appropriate action. Every method also returns an error code that is also checked. A second AddRecord method 276 and a second OnAddRecord event 278 are performed for a second FL record object sent to the client.

A SetStatus method (not shown) of the Utility APIs is called after each GetNextRecord method and each AddRecord method to update a progress thermometer in a dialog, for example. At the completion of the OnAddRecord event 278, the server calls a Send method 280 to send a dialog message in a dialog box on the video screen of the client, such as "2 mail records sent, 2 mail records received". The server 132 then invokes a disconnect task 290 by a Disconnect method 292. In the presently preferred embodiment, the client disconnects and responds with a OnDisconnect event 294 to the server. In another embodiment, the client does not respond with the OnDisconnect event 294, but does perform the disconnect housekeeping task.

While the above detailed description has shown, described, and pointed out the fundamental novel features of the invention as applied to various embodiments, it will be understood that various omissions and substitutions and changes in the form and details of the system illustrated may be made by those skilled in the art, without departing from the spirit of the invention.

What is claimed is:

1. A data synchronization system for a portable client computer, comprising:
   a data storage;
   a gateway computer having a persistent connection with the data storage, the gateway computer comprising a session module in communication with the data storage for retrieving data, removing data, or updating data in the data storage and wherein the data storage resides on a network that is further connected to the gateway computer; and
   a portable client computer, comprising:
      a client database, and
      a communications module capable of establishing a non-persistent connection to the gateway computer and allowing access to the client database from time to time for synchronization of at least a portion of the data in the client database.

2. The system of claim 1, wherein the access to the client database from the gateway computer is a query.

3. The system of claim 1, wherein the access to the client database from the gateway computer is to add data to the client database.

4. The system of claim 1, wherein the access to the client database from the gateway computer is to remove data from the client database.

5. The system of claim 1, wherein a portion of the client database is retrieved and stored in the data storage.

6. The system of claim 1, wherein the network is a wide area network.

7. The system of claim 6, wherein the wide area network is the Internet.

8. The system of claim 1, additionally comprising an application program running on the portable client computer, wherein the application program results in changes to the client database.

9. The system of claim 8, wherein the application program is for completing electronic forms.

10. The system of claim 1, wherein the data storage comprises a mail server so that the client computer can access electronic mail.

11. In a computer network, including a gateway computer, a data storage connected to a network that is further connected to the gateway computer, and a mobile client having a database, a method of synchronizing the client database and the data storage during a non-persistent connection, the method comprising the steps of:

connecting the mobile client to the gateway computer;

manipulating the client database by commands received from the gateway computer;

accessing the data storage by the gateway computer via the network;

updating the data storage responsive to the manipulation by the gateway computer; and disconnecting the client from the gateway computer.

12. The method of claim 11, additionally comprising the step of updating the client database.

13. The method of claim 11, wherein the manipulating step includes querying the client database.

14. The method of claim 11, wherein the manipulating step includes removing data from the client database.

15. The method of claim 11, wherein the data storage comprises a mail server so that the mobile client can access electronic mail.

16. The method of claim 11, wherein the gateway computer is persistently connected to the data storage.

17. The method of claim 11, wherein the network comprises a local area network.

18. The method of claim 11, wherein the network comprises a wide area network.

19. The method of claim 18, wherein the wide area network is the Internet.

* * * * *

(12) EX PARTE REEXAMINATION CERTIFICATE (7512th)
United States Patent
Wright, Jr. et al.

(10) Number: US 5,857,201 C1
(45) Certificate Issued: May 18, 2010

(54) ENTERPRISE CONNECTIVITY TO HANDHELD DEVICES

(75) Inventors: Gerald V. Wright, Jr., Solana Beach, CA (US); James O'Grady, Del Mar, CA (US)

(73) Assignee: Visto Corporation, Redwood City, CA (US)

Reexamination Request:
No. 90/010,125, Mar. 14, 2008

Reexamination Certificate for:
Patent No.: 5,857,201
Issued: Jan. 5, 1999
Appl. No.: 08/665,422
Filed: Jun. 18, 1996

(51) Int. Cl.
*G06F 17/30* (2006.01)
*H04L 29/08* (2006.01)

(52) U.S. Cl. .............. 707/104.1; 707/10; 707/201; 707/E17.005

(58) Field of Classification Search .............. None
See application file for complete search history.

(56) References Cited

U.S. PATENT DOCUMENTS

| | | | |
|---|---|---|---|
| 5,598,534 A | * | 1/1997 | Haas .............. 712/219 |
| 5,699,244 A | | 12/1997 | Clark, Jr. et al. |
| 5,867,688 A | | 2/1999 | Simmon et al. |
| 5,933,478 A | | 8/1999 | Ozaki et al. |
| 6,047,327 A | | 4/2000 | Tso et al. |

OTHER PUBLICATIONS

Roy Want, et al., A Focus on Context Sensitivity and the Spatial Arrangement of Computers, "An Overview of the PARCTAB Ubiquitous Computing Experiment", IEEE Personal Communications (Dec. 1995); pp. 28–43 (RIM00005649–RIM00005664).

Brown, Kevin et al., Mastering Lotus Notes, 1995 Sybex Incorporated.
Lamb, John P. and Lew, Peter W., Lotus Notes Network Design, 1996 McGraw–Hill.
Lotus Notes Release 4 Administrator's Guide, 1995 Lotus Development Corporation, Cambridge, MA.
Lotus Notes Release 4 Deployment Guide, 1995 Lotus Development Corporation, Cambridge, MA.
Courtois, Todde and Rischpater, Ray, "Portal: A PDA–to–World–Wide–Web Interface", published by AllPen Software, Inc., copyright 1994, PDA Developers 3.1, Jan./Feb. 1995 issue.

* cited by examiner

*Primary Examiner*—Matthew Heneghan

(57) ABSTRACT

A FormLogic (FL) client/server system and method to access existing enterprise data sources on an occasional basis. The system includes a FL builder program to generate a communications agent that encapsulates a communication session. The session includes one or more related tasks. The system also includes a FL server which is connected to one or more enterprise data sources. The FL server provides the ability to link hardware devices running a FL engine as a client to access existing enterprise data sources on an occasional basis. It is optimized to communicate by exchanging a minimum amount of data, since the wireless transports do not move large amounts of data quickly and data is expensive to move. Each session encompasses connecting the remote host, performing a specific task or set of tasks, then disconnecting from the host. Because the connection times must be short, the client and server need to be able to perform the required tasks without user intervention. The FL engine includes a user interface, a script engine, a communications module, and a local data store, and preferably runs on a mobile personal digital assistant. Upon connection, this local database is automatically manipulated by the FL server. The FL server can query the FL client database, add data to the client database, or remove data from the client database so as to make updates to both the client and server databases for reflecting changes that have happened on both sides since the last connection.

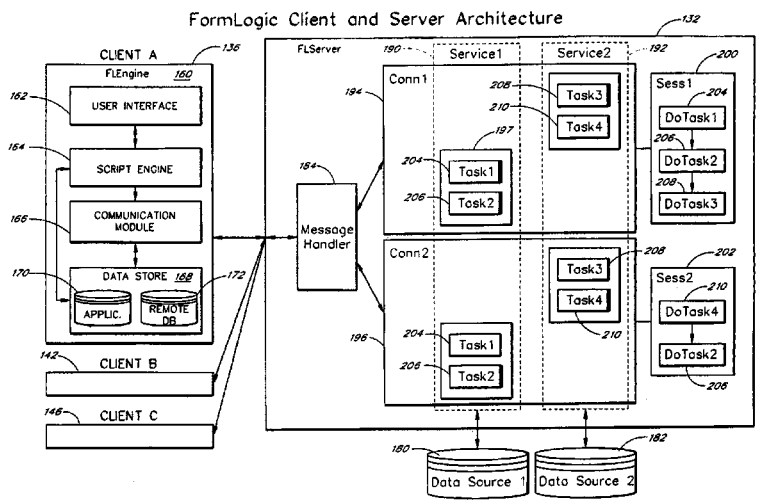

EX PARTE
REEXAMINATION CERTIFICATE
ISSUED UNDER 35 U.S.C. 307

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1 and 11 are determined to be patentable as amended.

Claims 2–10, 12–19 dependent on an amended claim, are determined to be patentable.

New claims 20–49 are added and determined to be patentable.

1. A data synchronization system [for a portable client computer], comprising:
   a data storage;
   a gateway computer having a persistent connection with the data storage, the gateway computer comprising a session module in communication with the data storage for retrieving data, removing data, or updating data in the data storage[and wherein], the data storage [resides] *residing* on a network that is further connected to the gateway computer; and
   a *handheld* portable client computer *operably linked to the gateway computer via a wireless link*, comprising:
   *a hardware independent virtual machine*;
   a client database, and
   a communications module capable of establishing a non-persistent connection to the gateway computer and allowing *wireless* access to the client database from time to time for synchronization of at least a portion of the data in the client database, *the at least a portion of the data synchronized being subject to service application processing via the hardware independent virtual machine.*

11. In a computer network, including a gateway computer, a data storage connected to a network that is further connected to the gateway computer, and a *handheld* mobile client having a database, *the handheld mobile client being operably linked to the gateway computer via a wireless link and including a hardware independent virtual machine*, a method of synchronizing the client database and the data storage during a non-persistent connection, the method comprising the steps of:
   connecting the *handheld* mobile client to the gateway computer *via a wireless link*; manipulating the client database *through service application processing of the virtual machine*, by *processing* commands received from the gateway computer;
   accessing the data storage, *at the handheld mobile client*, by *processing* the *commands received from* gateway computer via the network;
   updating the data storage responsive to the manipulation by the gateway computer; and
   disconnecting the client from the gateway computer.

20. *The system of claim 1, wherein the access of the client database is independent of an application programming interface (API) at the handheld portable client.*

21. *The system of claim 1, wherein the access of the client database is via a database API call procedure of the gateway computer to the service application of the hardware independent virtual machine.*

22. *The system of claim 1, wherein the access of the client database is by an object link exchange scheme shared between the gateway computer and handheld portable client.*

23. *The system of claim 1, wherein the handheld portable client computer is a PDA.*

24. *The system of claim 1, wherein the hardware independent virtual machine is embodied by a browser interface of the handheld portable client computer.*

25. *The method of claim 11, wherein the access of the client database is independent of an application programming interface (API) at the handheld mobile client.*

26. *The method of claim 11, wherein the access of the client database is via a database API call procedure of the gateway computer to the service application of the hardware independent virtual machine.*

27. *The method of claim 11, wherein the access of the client database is by an object line exchange scheme shared between the gateway computer and the handheld mobile client.*

28. *The method of claim 11, wherein the handheld mobile client is a PDA.*

29. *The method of claim 11, wherein the hardware independent virtual machine is embodied by a browser interface of the handheld.*

30. *A data synchronization system, comprising:*
   *a data storage;*
   *a gateway computer having a persistent connection with the data storage, the gateway computer comprising a session module in communication with the data storage for retrieving data, removing data, or updating data in the data storage, the data storage residing on a network that is further connected to the gateway computer, wherein the network includes the Internet; and*
   *a handheld portable client computer, comprising:*
   *a client database, and*
   *a communications module to establish a non-persistent connection to the gateway computer and allowing intermittent access to the client database for synchronization of at least a portion of the data in the client database.*

31. *The system of claim 30, wherein the access of the client database is independent of an application programming interface (API) at the handheld portable client computer.*

32. *The system of claim 30, wherein the access of the client database is via a database API call procedure of the gateway computer to a service application of the handheld portable client computer.*

33. *The system of claim 30, wherein the access of the client database is by an object link exchange scheme shared between the gateway computer and the handheld portable client computer.*

34. *The system of claim 30, wherein the handheld portable client computer is a PDA.*

35. *In a computer network, including a gateway computer, a data storage connected to a network that is further connected to the gateway computer, and a handheld mobile client having a database, a method of synchronizing the client database and the data storage during a non-persistent connection, the method comprising:* connecting the handheld mobile client to the gateway computer;

manipulating the client database by commands received from the gateway computer;

providing access to the data storage, to the gateway computer, via the Internet;

updating the data storage responsive to the manipulation by the gateway computer; and disconnecting the client from the gateway computer.

36. The method of claim 35, wherein the access of the client database is independent of an application programming interface (API) at the handheld mobile client.

37. The method of claim 35, wherein the access of the client database is via a database API call procedure of the gateway computer to a service application of the handheld mobile client.

38. The method of claim 35, wherein the access of the client database is by an object link exchange scheme shared between the gateway computer and the handheld mobile client.

39. The method of claim 35, wherein the handheld portable client is a PDA.

40. A data synchronization system, comprising:

a data storage;

a gateway computer having a persistent connection with the data storage, the gateway computer comprising a session module in communication with the data storage for retrieving data, removing data, or updating data in the data storage, the data storage residing on a network that is further connected to the gateway computer, the network being the Internet; and a handheld portable client computer operably linked to the gateway computer via a wireless local area network (LAN) link, comprising:

a client database, and a communications module to establish a non-persistent wireless LAN connection to the gateway computer and allowing intermittent, wireless LAN access to the client database for synchronization of at least a portion of the data in the client database.

41. The system of claim 40, wherein the access of the client database is independent of an application programming interface (API) at the handheld portable client computer.

42. The system of claim 40, wherein the access of the client database is via a database API call procedure of the gateway computer to a service application of the handheld portable client computer.

43. The system of claim 40, wherein the access of the client database is by an object link exchange scheme shared between the gateway computer and the handheld portable client computer.

44. The system of claim 40, wherein the handheld portable client computer is a PDA.

45. In a computer network, including a gateway computer, a data storage connected to a network that is further connected to the gateway computer, and a handheld mobile client having a database, a method of synchronizing the client database and the data storage during a non-persistent connection, the method comprising:

connecting the handheld mobile client to the gateway computer via a wireless local area network (LAN) link;

manipulating the client database by commands received from the gateway computer;

providing access to the data storage, to the gateway computer, via the Internet;

updating the data storage responsive to the manipulation by the gateway computer; and disconnecting the client from the gateway computer.

46. The method of claim 45, wherein the access of the client database is independent of an application programming interface (API) at the handheld mobile client.

47. The method of claim 45, wherein the access of the client database is via a database API call procedure of the gateway computer to a service application of the handheld mobile client.

48. The method of claim 45, wherein the access of the client database is by an object link exchange scheme shared between the gateway computer and the handheld mobile client.

49. The method of claim 45, wherein the handheld portable client is a PDA.

* * * * *